Dec. 23, 1924.
J. BOCA
WINDSHIELD
Filed April 14, 1922
1,520,051
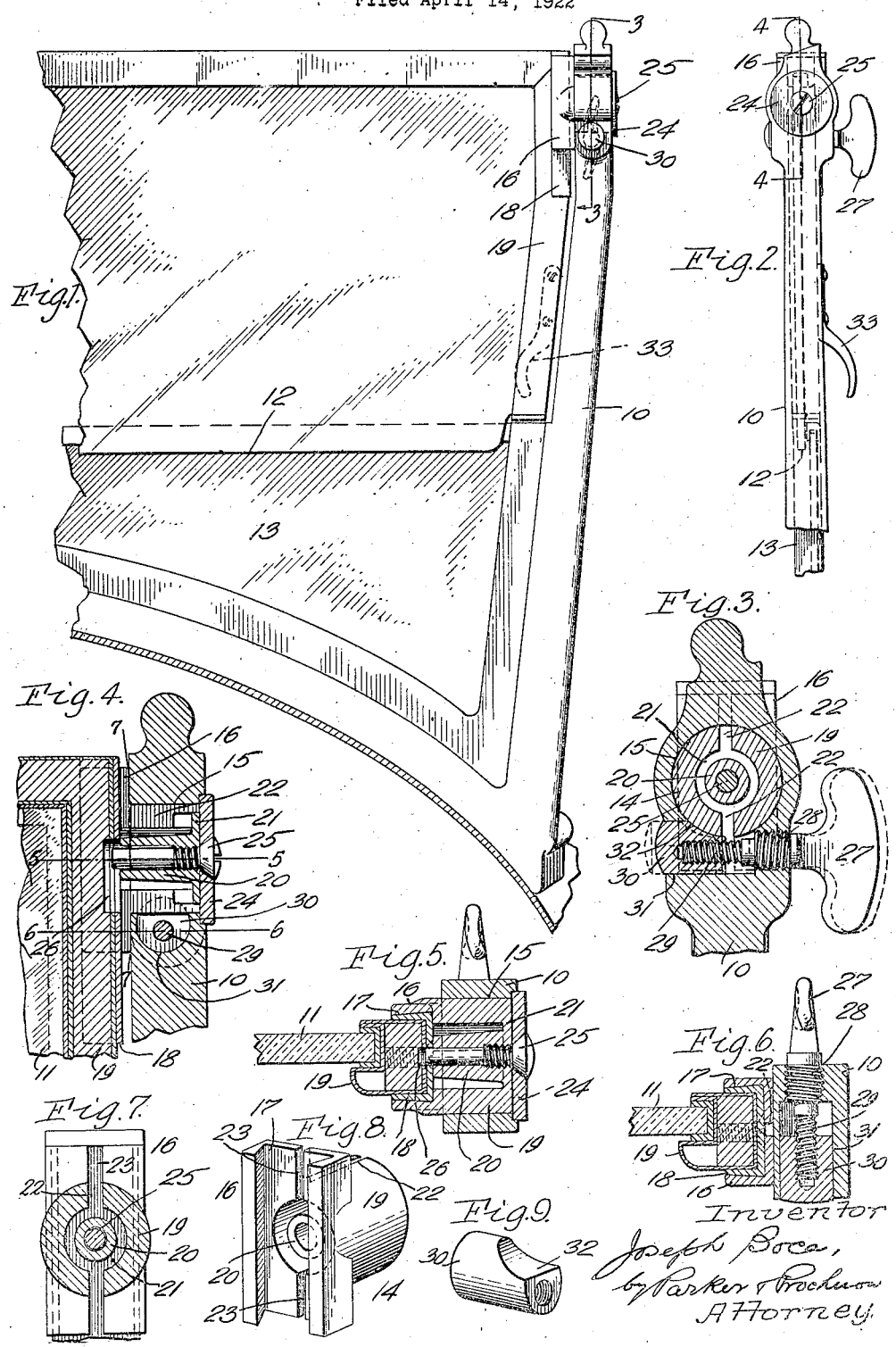

Patented Dec. 23, 1924.

1,520,051

UNITED STATES PATENT OFFICE.

JOSEPH BOCA, OF BUFFALO, NEW YORK, ASSIGNOR TO THE PIERCE-ARROW MOTOR CAR COMPANY, OF BUFFALO, NEW YORK.

WINDSHIELD.

Application filed April 14, 1922. Serial No. 552,563.

*To all whom it may concern:*

Be it known that I, JOSEPH BOCA, a subject of the King of Belgium, residing at Buffalo, in the county of Erie and State of New York, have invented a new and useful Improvement in Windshields, of which the following is a specification.

This invention relates to windshields for automobiles, and analogous devices, and more particularly to improvements in automobile windshields of that kind in which the windshield or a section thereof is pivotally mounted to permit the same to be adjusted to different angular positions and the lower or free edge of which overlaps an adjacent glass or part for more effectually preventing the passage of the elements through the joint between such edge and part.

One object of the invention is to provide a practical and desirable mounting for the adjustable windshield or windshield-section which will permit the same to be readily shifted so that its free edge will clear or pass by an overlapping section or part, and will enable the adjustable section to be swung to and stationarily secured either in an upright position or at any desired forward or rearward inclination. Other objects of the invention are to provide a combined sliding and pivotal mounting for the adjustable windshield or windshield-section whereby the latter can be readily released for adjustment both edgewise and pivotally and readily secured rigidly in the desired adjustment by the operations of a single securing device at each end of the adjustable shield or section; also to improve windshields in the other respects hereinafter described and set forth in the claims.

In the accompanying drawings:

Fig. 1 is a fragmentary front elevation of an automobile windshield embodying the invention, Fig. 2 is an end elevation thereof, Fig. 3 is an enlarged sectional elevation of the securing means for the adjustable windshield or section on line 3—3, Fig. 1, Fig. 4 is an enlarged longitudinal sectional elevation thereof on line 4—4, Fig. 2, Figs. 5 and 6 are sectional plan views thereof on lines 5—5 and 6—6 respectively, Fig. 4, Fig. 7 is a transverse vertical sectional elevation thereof on line 7—7, Fig. 4, Fig. 8 is a perspective view, detached, of the pivot trunnion, and Fig. 9 is a perspective view, detached, of the clamping or wedge block of the securing device.

10 represents one of the stationary side supports or upright posts of the windshield, there being, as usual, one of these posts at each of the opposite ends of the windshield. 11 represents the adjustable windshield or windshield-section which consists of a pane of glass framed on its upper and end edges and mounted at its opposite ends upon the posts 10 so as to adapt the section 11 to be swung forwardly or rearwardly between the posts 10 to different desired positions. The windshield shown in the drawings is provided, in addition to the adjustable shield or section 11, with a fixed section 13 which consists of a glass pane framed on its lower and end edges and stationarily secured in place between the lower portions of the posts 10. In the normal or upright position of the adjustable section 11 the lower edge 12 thereof depends below, or overlaps, the upper edge of the lower glass or section 13 so as to effectually prevent the passage of wind or rain through the joint between these parts. On account of the overlapping of the edges of the sections 11 and 13 it is necessary, before the adjustable section 11 can swing in one direction, for instance rearwardly, for it first to be shifted edgewise or parallel with its face to clear the edge of the other section. For this purpose the adjustable section 11 is slidably and pivotally mounted on the side posts 10, preferably in the following manner.

14 represents a journal or trunnion, one of which is provided at each end of the windshield and is adapted to turn in a bearing hole 15 in the side post or support 10. This trunnion is provided at its inner end, with a T-head 16 in which is formed a dovetailed recess 17 which, in the upright position of the windshield-section 11, extends vertically and slidably receives a correspondingly shaped slide piece 18 which is welded or otherwise stationarily secured on the end bar 19 of the frame of the adjustable windshield-section 11. The slide piece 18 is preferably channel shaped and embraces the frame bar of the windshield section and has front and rear sides which diverge outwardly correspondingly to the sides of the recess in the head of the trunnion so that, while the slide piece 18 is adapted to slide endwise in the recess 17, it is prevented from lateral disengagement from the recess. The trunnion 14 is preferably hollow, having a cylindrical outer shell 19 and a central hub 20 which are connected at the outer end of the trunnion by an end wall 21. The cylindrical shell 19 of the trunnion is slotted lengthwise at its upper and lower sides as indicated at 22 and these slots extend through the head 16 of the trunnion as indicated at 23, thus adapting the inner end of the trunnion and its head 16 to be contracted, or the parts thereof forced towards each other under pressure, to cause the recessed head 16 to grip or clamp the slide piece 18 on the end of the windshield-section. By thus contracting the head 16 the slide piece 18 and the windshield section on which it is fixed will be firmly gripped and stationarily held from movement on the trunnion.

The trunnion is preferably rotatably retained in the bearing hole 15 in the side post by a washer or end plate 24 which is secured by a screw 25 on the outer end of the trunnion and is seated in a shallow, circular depression in the outer face of the side post. Since the head 15 of the trunnion and the plate 24 bear respectively against the inner and outer faces of the side post, the trunnion can be held against endwise play in the bearing and friction created to oppose rotation of the trunnion in the bearing by tightening the screw 25. The securing screw 25 preferably extends through the hub of the trunnion and projects inwardly beyond the same into a longitudinal slot 26 in the slide piece 18 on the end of the windshield section so that the screw serves as a stop to limit the sliding adjustment of the windshield section on the trunnion.

A single securing means is preferably employed for holding the trunnion from turning in its bearing in the side post and for contracting the split head of the trunnion on the windshield section to clamp it to the trunnion. Such securing means is preferably constructed as follows. 27 represents a thumb screw, the shank of which extends tangentially relatively to the bearing 15 for the trunnion and is provided with a thread 28 engaging in a threaded hole in one side of the side post 10. The shank is provided at its end with a second thread 29 which engages in the threaded hole in a clamping or wedge block 30 which is movable toward and from the trunnion in a hole 31 in the side post and is provided with a curved or beveled face 32 adapted to bear against the cylindrical face of the trunnion at one side of the slot 22 therein. By turning the thumb screw 27 in one direction the clamping block 30 is drawn inwardly against the split trunnion and clamps and holds the same from turning in the bearing 15, and at the same time contracts the split head 16 at the inner end of the trunnion on the slide piece 18, thereby firmly clamping the latter in the recess 17 and thus rigidly securing the windshield section to the trunnion. The threads 28 and 29 of the thumb screw are of opposite pitch so that when the thumb screw is turned in a direction to release the trunnion, the clamping block will be forcibly moved outwardly away from the trunnion thereby positively insuring the releasing of the trunnion and making certain the easy releasing, as well as the securing, of the parts. When the thumb screws 27 are turned in the direction to release the trunnions, the heads 16 thereof will expand or release their grip on the slide pieces 18, so that the windshield section 11 can then be shifted vertically or edgewise in the trunnion heads until its lower edge clears the lower windshield section 13, whereupon the adjustable section 11 can be swung rearwardly or forwardly to any desired position and there secured by tightening the thumb screws. In order to facilitate the shifting and adjustment of the windshield section 11, finger pieces 33 are preferably secured thereon at the rear side of its opposite ends where the driver can readily grasp the same.

I claim as my invention:

1. The combination with an adjustable windshield or the like, of pivots mounted on said windshield, supports on which said pivots turn about a fixed pivotal axis, slidable connections between said shield and said pivots whereby said shield is shiftable edgewise of itself relatively to said pivots, and a single securing device operable to secure said shield against both said pivotal and sliding movements.

2. The combination with an adjustable windshield or the like, of pivot trunnions for said shield, bearings by which said trunnions are rotatably supported, clamping means adjustably connecting said shield to said trunnions, and a single securing device for each trunnion which holds said trunnion stationary on its bearings and operates said clamping means to secure the shield stationarily to the trunnion.

3. The combination with an adjustable windshield or the like, of pivot trunnions for said shield, bearings by which said trunnions are rotatably supported, said trunnions having split portions in which said shield adjustably fits, and means for contracting said split portions to secure said shield and for holding said trunnions from turning on their bearings.

4. The combination with an adjustable windshield or the like, of pivot trunnions on said shield, fixed bearings in which said trunnions are arranged to turn, contractible clamps on said trunnions engaging said shield and permitting adjustment of said shield edgewise of itself on said trunnions, a movable clamping block in each bearing adapted to engage the companion trunnion to hold said trunnion from turning in the bearing and to contract the clamp of said trunnion on said shield to secure the shield stationarily to the trunnion, and screw devices for operating said clamping blocks.

JOSEPH BOCA.